G. H. POOR.
SAFETY STORAGE RECEPTACLE FOR COMBUSTIBLE LIQUIDS.
APPLICATION FILED NOV. 4, 1911.
1,143,646.
Patented June 22, 1915.
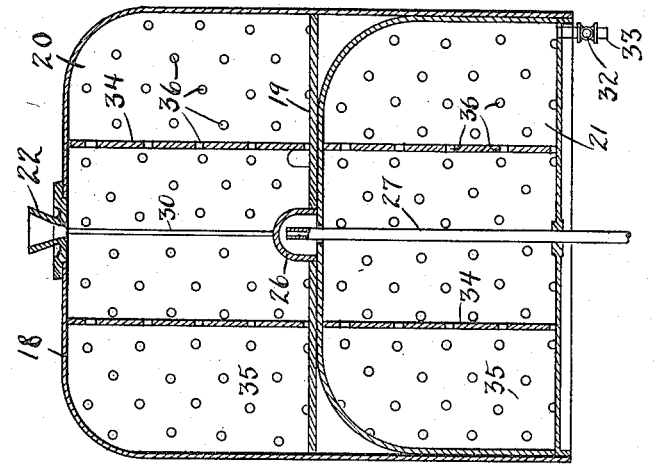
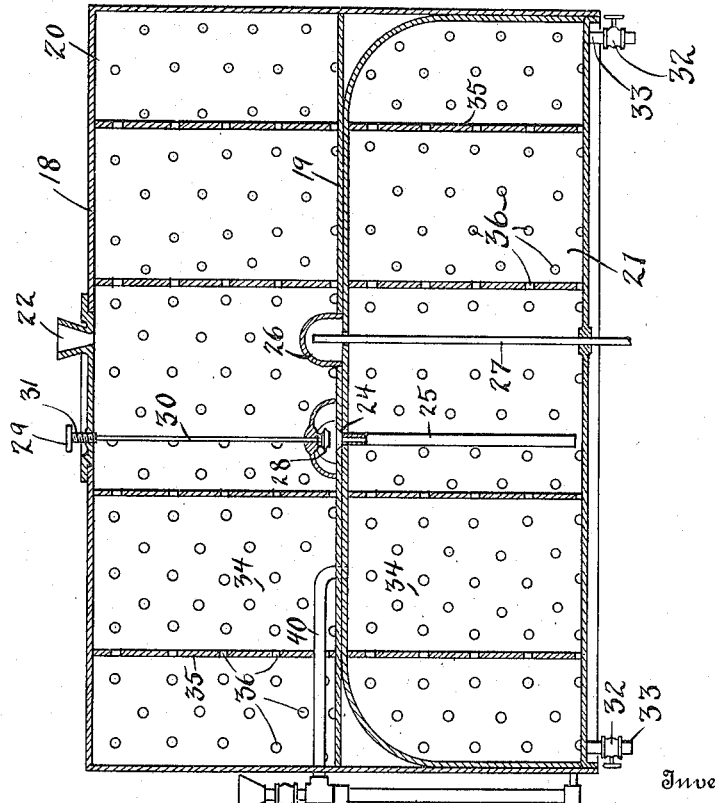

UNITED STATES PATENT OFFICE.

GILBERT H. POOR, OF MILWAUKEE, WISCONSIN.

SAFETY STORAGE-RECEPTACLE FOR COMBUSTIBLE LIQUIDS.

1,143,646.

Specification of Letters Patent. Patented June 22, 1915.

Application filed November 4, 1911. Serial No. 658,523.

*To all whom it may concern:*

Be it known that I, GILBERT H. POOR, a citizen of the United States, residing at Milwaukee, county of Milwaukee, and State of Wisconsin, have invented new and useful Improvements in Safety Storage-Receptacles for Combustible Liquids, of which the following is a specification.

The object of my invention is to provide a safe and efficient means of storing gasolene and other combustible liquids under pressure, and forcing the same from their containing reservoirs to a combustion chamber, lamp, engine or other place where it is to be consumed.

By my improvement, the gasolene or other combustible liquid is displaced and forced from its containing reservoir by water under pressure, whereby the danger from explosions is avoided. In view of the fact that it is often impossible, or at least inconvenient, to procure a new supply of water every time the supply of gasolene or other combustible liquid is exhausted, I have provided means for repeatedly using the same water for displacing each new supply of combustible liquid.

My invention is further explained by reference to the accompanying drawings, in which—

Figure 1 represents a longitudinal section, and Fig. 2 a transverse section of a form of my system, in which the water and combustible liquid are stored in a single receptacle divided into two compartments by transversely arranged partitions.

Like parts are identified by the same reference numerals throughout the several views.

When my system is used with automobiles or other moving vehicles, the gasolene and water are both preferably stored in a single reservoir 18, and such reservoir is subdivided at its center with a partition 19, when the water is stored in an upper compartment 20, and the gasolene or other combustible liquid in the compartment 21. The upper compartment 20 is charged with water through the duct 22, and the lower compartment is charged with gasolene or other combustible liquid through the duct 23. Water is led from the compartment 20 to the compartment 21, through the valve port 24 and duct 25, whereby the gasolene which is buoyed up by the water, is caused to pass into the dome 26, and from thence down through the outlet tube 27 to the place where it is used.

When desirous to operate the system, the valve 28 is raised by turning the hand wheel 29. The hand wheel 29 is connected with the valve 28 through the rod 30, and the upper end of said rod is provided with a screw thread operating in a threaded bearing formed in the upper wall of the receptacle 18, whereby said valve 28 is raised by turning said hand wheel 29 in one direction, and is lowered by a reverse movement of said hand wheel. When desirous to draw off the water or gasolene, or both, from the receptacle 18, the valves 32 are opened, when the contents of the lower receptacle are free to pass out through the ducts 33. To prevent the contents of the receptacle 18 from splashing as the same is being used in an automobile or other moving vehicle, I provide the same with a plurality of longitudinal splash plates 34, and a plurality of transversely arranged splash plates 35, which plates are provided with a plurality of apertures 36. When the water is passed from the upper compartment 20 to the lower compartment 21, and the gasolene has been forced from said lower compartment 21 in the manner described, the water may be forced back from the lower compartment 21 to the upper compartment 20 by forcing gasolene into the compartment 21 above the surface of the water, whereby the water will be forced back up through the duct 25 into said compartment 20. To accomplish this object, it becomes necessary to attach a force pump to the inlet nozzle 37. When this is done, the valve 38 is opened and the valve 39 is closed, when by operating the force pump, the gasolene will be discharged with pressure through the duct 40 into the lower compartment 21, whereby the water in said compartment 21 will pass, as stated, up through the duct 25 and valve port 24, into the upper compartment 20, the valve 28 being raised, as previously described. When the water has thus been forced back into the compartment 20, the valve 38 is again closed, when the system is ready for use.

It will, of course, be understood that the water may, if desired, be withdrawn from the compartment 21 through either one of the outlet ducts 33, when it may be conveyed to the upper compartment with a pail, and discharged therefrom through the inlet duct 22.

For brevity and convenience of description, the tanks and compartments in which the water and combustible liquid are stored, are respectively referred to in the claims as water and gasolene receptacles.

Having thus described my invention, what I claim as new and desire to secure by Letters Patent, is—

1. In a device of the described class, the combination of a single tank subdivided by a partition into a water and a gasolene receptacle, a plurality of vertical splash plates provided with apertures subdividing both of said receptacles into a plurality of separate small compartments, a water duct communicating from the bottom of said water receptacle to the bottom of said gasolene receptacle, a gasolene duct communicating from the top of said gasolene receptacle to the place of consumption, and ducts for supplying said receptacles with water and gasolene.

2. In a device of the described class, the combination of a single tank subdivided by a partition into a water and a gasolene receptacle, a plurality of vertical splash plates provided with apertures subdividing said receptacles into a plurality of separate compartments, a water duct communicating from the bottom of said water receptacle to the bottom of said gasolene receptacle, a manually controlled valve for closing the mouth of said water duct, a gasolene duct communicating from the top of said gasolene receptacle to the place of consumption, ducts for supplying said receptacles respectively with water and gasolene, a duct for drawing off the liquid from said gasolene receptacle, and a valve for closing said duct, all substantially as and for the purpose specified.

In testimony whereof I affix my signature in the presence of two witnesses.

GILBERT H. POOR.

Witnesses:
JAS. B. ERWIN,
I. D. BREMER.

Copies of this patent may be obtained for five cents each, by addressing the "Commissioner of Patents, Washington, D. C."